United States Patent
Knabenbauer

[15] 3,693,849
[45] Sept. 26, 1972

[54] COMBINATION BACK PACK AND PACK SLED

[72] Inventor: Melvin K. Knabenbauer, 4573 W. 154th St., Lawndale, Calif. 90260

[22] Filed: Sept. 30, 1971

[21] Appl. No.: 185,124

[52] U.S. Cl..................224/9, 224/25 A, 280/18, 280/20
[51] Int. Cl..................................A45f 3/00
[58] Field of Search.......280/18, 19, 20, 12; 224/7 R, 224/8 R, 8 A, 9, 25 R, 25 A, 46

[56] References Cited

UNITED STATES PATENTS

| | | | |
|---|---|---|---|
| 1,583,693 | 5/1926 | Krafft | 380/20 |
| 3,158,299 | 11/1964 | Weir et al. | 224/25 A |
| 2,667,996 | 2/1954 | Fanelli | 224/25 A X |

FOREIGN PATENTS OR APPLICATIONS

| | | | |
|---|---|---|---|
| 276,583 | 10/1951 | Switzerland | 224/9 |
| 343,238 | 1/1960 | Switzerland | 280/18 |

Primary Examiner—Robert G. Sheridan
Assistant Examiner—Jerold M. Forsberg
Attorney—John Holtrichter, Jr.

[57] ABSTRACT

A structure including telescoping sections each having sled-like side rails and a flat center portion, one of which sections has an upwardly curved toboggan-like front end with a curvature corresponding with the curvature of the leading edges of the side rails, the structure being adapted to be carried on a person's back by use of shoulder straps when in a closed configuration, and to be used to carry a load in the form of a sled through snow and ice when in an open configuration.

8 Claims, 5 Drawing Figures

PATENTED SEP 26 1972 3,693,849
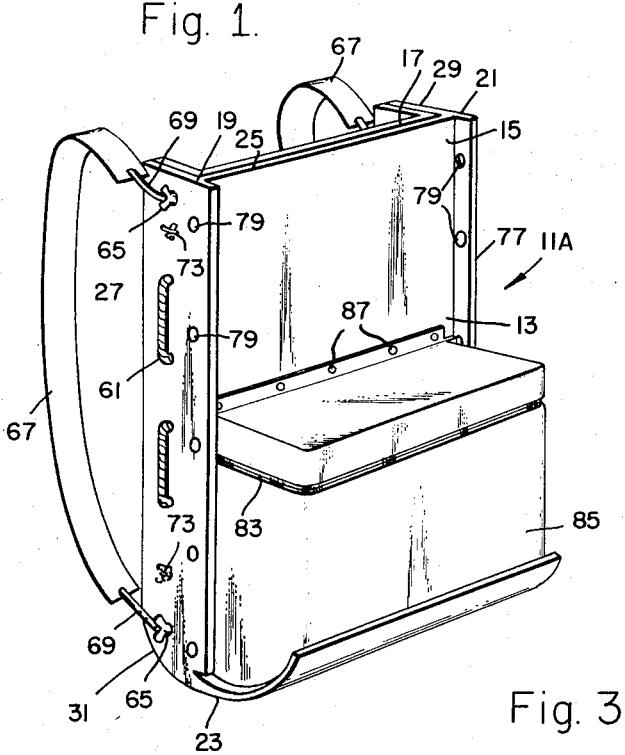
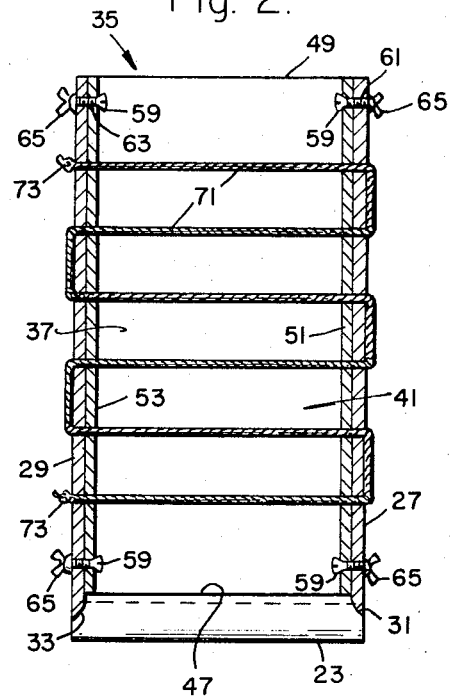
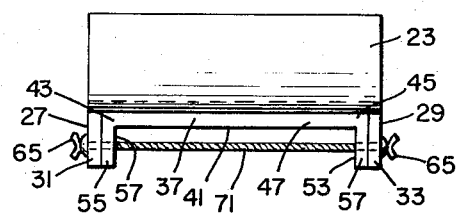
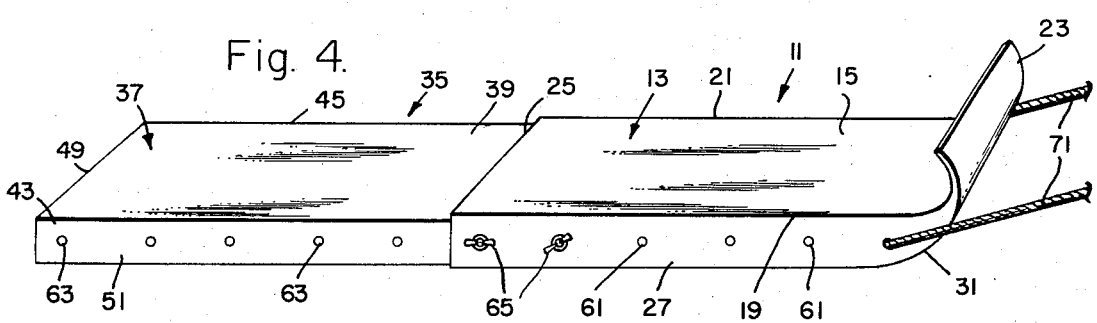
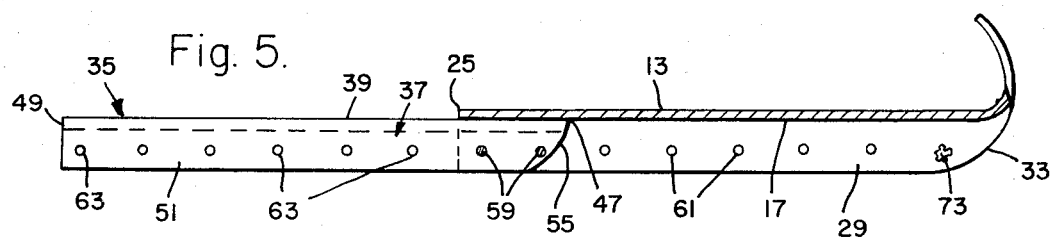

COMBINATION BACK PACK AND PACK SLED

BACKGROUND OF THE INVENTION

The background of the invention will be set forth in two parts.

1. Field of the Invention

The present invention pertains generally to the field of transporting apparatus, and more particularly to the field of apparatus for campers, sportsmen, woodsmen, trappers, and the like.

2. Description of the Prior Art

Over the years many different constructions have been devised for the purpose of aiding sportsmen to transport camping equipment, supplies and the like to and from relatively rough terrain where conventional means of transportation, such as automobiles, trucks, etc., could not be used.

These devices initially took the form of a pair of poles tied together at one end and having an animal skin stretched between the poles near the other end. The ends of the separated poles were pulled across the ground, with the load supported by the animal skin. Much later, a wooden framework was fabricated which utilized a pair of wheels at its lower end. It can be easily understood that although these devices were an improvement over merely dragging the load across the ground, the first mentioned scheme had severe limitations as did the wheeled outfit. For example, the poles had to be relatively long and consequently necessitated that they be procured from the particular area where the user happened to be at the time of need. As to the wheeled configuration, these proved to be very bulky and heavy and never became popular. This unpopularity also possibly obtained due to the fact that the wheels did not function well in snow, mud and in dry but rocky terrain.

Newer designs tended to stress portability and generally included a pack board which included shoulder straps and elaborate folding structure which could be formed into a boat, litter, etc. These have proved to be very heavy, bulky and lacking in strength which is of utmost importance in this field. Other configurations used a separate pack board and a sled structure strapped together by cords and fabric. These devices took much time and effort to set up and were extremely limited in length so that only relatively small or compact loads could be transported. For example, it would be very difficult to carry a deer or elk, being 6 to 8 feet in length, on such a device since the sled portion is necessarily not much longer than about 3 feet in length in order not to hinder the person carrying the outfit on his back prior to its use as a means for transporting the game.

The prior art also include folding sleds which are hinged at one end to form housings and the like. Because of the hinged configuration, these structures are very bulky and heavy and not suitable for holding a load and while being carried on a person's back. It can thus be seen from the foregoing that a simple, inexpensive, lightweight and yet strong combination back pack and pack sled capable of carrying heavy and large loads over rough snow and ice covered terrain would constitute a substantial advancement of the art.

SUMMARY OF THE INVENTION

In view of the foregoing factors and conditions characteristic of the prior art, it is a primary object of the present invention to provide a new and improved combination back pack and pack sled not subject to the disadvantages enumerated above.

It is another object of the present invention to provide a simple and economical-to-construct, yet strong and durable combination back pack and pack sled.

It is also another object of the present invention to provide a combination back pack and pack sled which includes telescoping framework that allows the sled to carry very heavy and large loads such as deer and elk, and the like.

It is still another object of the present invention to provide a combination back pack and pack sled which includes a collapsible fabric pouch.

According to the present invention, a combination back pack and pack sled is provided which includes a first rigid section having a relatively flat portion with upper and lower broad surfaces as well as parallel sides and front and rear ends, the front end being curved upwardly toboggan-like and one of a pair of parallel side rail portions being disposed below the flat portion along each of the sides, the leading edges of the side rail portions being curved to conform with the curvature of the front end. A second rigid section having a relatively flat portion with upper and lower broad surfaces as well as parallel sides and front and rear ends is also included. One of a pair of parallel side rail portions is also disposed below the second section flat portion along each of its sides, the leading edge of the second section side rail portion being curved to conform with the curvature of the leading edges of the first section side rail portions. Also included is adjustable section locating means cooperating with the first and second sections for holding the sections in any desired overlapping telescoping relationship whereby the respective flat portions and side rail portions are adjacent and parallel to each other, the depth dimension of the side rail portions being such that the lower edges thereof are in a common plane parallel to the flat portions. The apparatus further includes carrying means including shoulder straps coupled to at least one of the rigid sections for transporting the apparatus on a person's back.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawing in which like reference characters refer to like components in the several view.

BRIEF DESCRIPTION OF THE DRAWING

FIG. 1 is a perspective view of the presently preferred embodiment of the invention in its closed or back pack configuration;

FIG. 2 is a plan view of the back pack configuration of another embodiment of the invention similar to that shown in FIG. 1;

FIG. 3 is a front end view of the invention as shown in FIG. 2;

FIG. 4 is a perspective illustration of the invention in its open or pack sled configuration; and FIG. 5 is a side elevational view, partially broken away, of the pack sled shown in FIG. 4.

DESCRIPTION OF THE INVENTION

Referring now to the drawing and more particularly to the combination back pack and pack sled as shown in FIG. 1–3, there is shown a first rigid section 11 of wood, plastic or light metal or metal alloy having a relatively flat portion 13 with upper and lower broad surfaces 15 and 17 as well as parallel sides 19 and 21, and front and rear ends 23 and 25, respectively. The front end 23 is curved upwardly in a toboggan-like configuration and a pair of parallel side rail portions 27 and 29 are disposed below the flat portion 13 along respective ones of the sides 19 and 21. As can be best seen in FIG. 1, the leading edges 31 and 33 of the side rail portions 27 and 29 are curved to conform to the curvature of the front end 23.

The apparatus also includes a second rigid section 35 of the same or similar material to that of the first section 11 and has a relatively flat portion 37 with upper and lower broad surfaces 39 and 41 as well as parallel sides 43 and 45 and front and rear ends 47 and 49, respectively. As in the first section, the second section also has a pair of side rail portions 51 and 53 disposed below the second section flat portion 37 along each of its sides 43 and 45. Leading edges 55 and 57 of these portions 51 and 53 are also curved to conform to the curvature of the leading edges 31 and 33 of the first section side rail portions 27 and 29, as best seen in FIG. 5.

The first and second sections 11 and 35 are held in a telescoping overlapping relationship, with the lower surface 17 adjacent the upper surface 39, by means of conventional threaded bolts 59 passing through ones of a series of suitable holes 61 and 63 in respective side rail portions 27, 29 and 51, 53, and associated threaded wing nuts 65. The holes 61 and 63 are evenly spaced and located such that when the sections 11 and 35 are totally overlapped (closed configuration) these holes line up to allow the bolts and nuts to hold the sections as illustrated in the back pack relation of FIG. 1. Alternately, the structure may be converted into a relatively large pack sled since the bolts may be temporarily removed and sections allowed to slide apart or telescoped to any desired relationship (open configuration) up to the maximum length as seen in FIGS. 4 and 5, when the bolts are again inserted in appropriate matching holes 61 and 63.

Referring again to FIG. 1, when the sections 11 and 35 are held in the compact back pack relationship, suitable leather or fabric straps 67 may be removably attached to the wing nut 65 adjacent each end of the sections by cord 69 for example. In order to provide a comfortable fit on the back of the bearer, a cord 71 of synthetic material, for example, is laced side-to-side progressing from one end of the device to the other as illustrated in FIG. 2, with knots 73 tied at its ends to hold the cord 71 in place. Of course, when desired to "open" the apparatus, the cord 71 is unlaced and the ends may be threaded only through the most forward holes 61 and 63 and knotted thereat so that the cord 71 may now serve as a lead rope to pull the sled over nearly any terrain.

The presently preferred embodiment of FIG. 1, is very similar to the embodiment of FIG. 1, is very similar to the embodiments of the invention shown in the other figures except that in the first section 11A, a pair of raised lip portions 75 and 77 are provided along the respective ones ones of the sides 19 and 21. Holes 79 are situated generally uniformly along these lip portions to allow cords (not shown) to be threaded therethrough and about a load to be securely tied on to the apparatus in either of its configurations. Also, a pouch 81 of any suitable flexible material such as fabric or a plastic material may be attached to the upper side 15 of the first section flat portion 13. The pouch 81 may include any conventional fastening arrangement such as the zipper 83 shown. It will be noted that the lower end 85 of the pouch is preferably positioned within the curvature of the front end 23 for added support. Any conventional means such as rivets 87 may be used to attach the pouch to the portion 13.

It should be evident that the combination back pack and pack sled described and illustrated here and above and in the drawing advances the art by providing a very compact, strong and yet lightweight structure which can be used to pack supplies into a wilderness, for example, and which thereafter can easily and quickly be converted into a relatively large pack sled for carrying out of rough terrain, such as snow, mud and ice, large and heavy objects such as big game and the like.

Although only two embodiments of the invention have been described in detail, it should be understood that other arrangements and configurations utilizing the inventive features of the present invention may be constructed. Also, it should be further understood that the materials described herein are not critical and any suitable materials capable of performing the desired functions may be substituted for the materials specified. Accordingly, it is intended that the foregoing disclosure and drawing shall be considered only as illustrations of the principles of this invention.

What is claimed is:

1. A combination back pack and pack sled apparatus, comprising:

a first rigid section having a relatively flat portion with upper and lower broad surfaces as well as parallel sides and front and rear ends, said front end being curved upwardly toboggan-like and one of a pair of parallel side rail portions being disposed below said flat portion along each of said sides, the leading edges of said side rail portions being curved to conform to the curvature of said front end;

a second rigid section having a relatively flat portion with upper and lower broad surfaces as well as parallel sides and front and rear ends, one of a pair of parallel side rail portions being disposed below said second section flat portion along each of its sides, the leading edges of said second section side rail portions being curved to conform to the curvature of said leading edges of said first section side rail portions;

adjustable section locating means cooperating with said first and second sections for holding said sections in any desired overlapping telescoping relationship whereby said respective flat portions and side rail portions are adjacent and parallel to each other, the depth dimension of said side rail portions being such that the lower edges thereof are in a common plane parallel to said flat portions; and carrying means including shoulder straps coupled to at least one of said rigid sections for transporting said apparatus on a person's back.

2. The apparatus according to claim 1, wherein said section locating means includes a series of associated holes along each of said side rail portions and also includes attachment elements extending through at least two matching ones of said holes in each of the two adjacent side rail portions.

3. The apparatus according to claim 2, wherein said attachment elements include threaded bolts and associated wing nuts.

4. The apparatus according to claim 1, wherein said first rigid section also includes a ridge extending above said upper broad surface along each of said sides.

5. The apparatus according to claim 4, wherein each of said ridges includes a plurality of holes extending transversally therethrough.

6. The apparatus according to claim 2, wherein a cord is laced through said series of associated holes between said side rail portions as a back support structure.

7. An apparatus according to claim 1, also including a fabric pouch attached to said first section upper surface adjacent said upwardly curved front end.

8. An apparatus according to claim 7, wherein said pouch includes top and bottom portions, said bottom portion being within the curvature of said front end, and said top portion including an opening lid and a fastening arrangement to hold said lid closed.

* * * * *